(12) United States Patent
Hauser et al.

(10) Patent No.: US 10,676,130 B1
(45) Date of Patent: Jun. 9, 2020

(54) ELECTRIC TRANSAXLE WITH INTEGRAL POWER GENERATING DEVICE

(71) Applicant: Hydro-Gear Limited Partnership, Sullivan, IL (US)

(72) Inventors: Raymond Hauser, Sullivan, IL (US); Alyn G. Brown, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 16/228,172

(22) Filed: Dec. 20, 2018

Related U.S. Application Data

(60) Division of application No. 15/640,329, filed on Jun. 30, 2017, now Pat. No. 10,183,694, which is a
(Continued)

(51) Int. Cl.
*B62D 11/04* (2006.01)
*A01D 69/00* (2006.01)
(Continued)

(52) U.S. Cl.
CPC ............ *B62D 11/04* (2013.01); *A01D 69/025* (2013.01); *B60L 15/2036* (2013.01);
(Continued)

(58) Field of Classification Search
CPC ....... B62D 11/04; B62D 11/003; B62D 11/10; B60L 15/2036; B60L 2240/465; A01D 69/025; A01D 69/02; A01D 2101/00
(Continued)

(56) References Cited

U.S. PATENT DOCUMENTS

| 1,692,371 A | 11/1928 | Froesch |
| 6,591,593 B1 | 7/2003 | Brandon et al. |

(Continued)

FOREIGN PATENT DOCUMENTS

| EP | 1396465 | 3/2004 |
| EP | 1919727 | 10/2014 |

(Continued)

OTHER PUBLICATIONS

History of TM4 Axle Drive Package, Date unknown but believed to be at least as early as Aug. 28, 2014, 6 pp.
(Continued)

*Primary Examiner* — John D Walters
(74) *Attorney, Agent, or Firm* — Neal, Gerber & Eisenberg LLP

(57) ABSTRACT

A vehicle drive and control system includes an input shaft driven by a prime mover and extending into a housing to drive a generator. An electric motor powered by the generator drives an output axle, which may be a single axle extending out one side of the housing, or a through shaft extending through the electric motor and out both sides of the housing. The input shaft may be parallel to the axle. A power controller is configured to back-drive the generator when certain predetermined conditions are met. A motor controller may control an output of the motor based on input received via an operator control device, and the motor controller is configured to operate the motor as a generator under certain operating conditions. The transaxle includes a common housing in which the power generator, the motor, and controllers for the generator and electric motor are disposed.

20 Claims, 15 Drawing Sheets

Related U.S. Application Data continuation-in-part of application No. 14/838,626, filed on Aug. 28, 2015, now Pat. No. 9,828,025.

(60) Provisional application No. 62/357,789, filed on Jul. 1, 2016, provisional application No. 62/048,518, filed on Sep. 10, 2014, provisional application No. 62/043,274, filed on Aug. 28, 2014.

(51) Int. Cl.
| | | |
|---|---|---|
| *B62D 11/10* | (2006.01) | |
| *B62D 11/00* | (2006.01) | |
| *B60L 15/20* | (2006.01) | |
| *A01D 69/02* | (2006.01) | |
| *A01D 101/00* | (2006.01) | |

(52) U.S. Cl.
CPC ............ *B62D 11/003* (2013.01); *B62D 11/10* (2013.01); *A01D 2101/00* (2013.01); *B60L 2240/465* (2013.01)

(58) Field of Classification Search
USPC .......................................... 180/65.21, 65.31
See application file for complete search history.

(56) References Cited

U.S. PATENT DOCUMENTS

| | | | |
|---|---|---|---|
| 6,717,281 B1 | 4/2004 | Brandon et al. | |
| 6,856,035 B2 | 2/2005 | Brandon et al. | |
| 6,886,647 B1 | 5/2005 | Gotta | |
| 6,988,570 B2 * | 1/2006 | Takeuchi | B60L 15/2036 180/6.48 |
| 7,178,617 B2 * | 2/2007 | Morisawa | B60K 6/48 180/65.265 |
| 8,091,677 B2 * | 1/2012 | Murty | B60L 58/12 180/293 |
| 8,485,286 B2 * | 7/2013 | Thompson | B60K 7/0007 180/6.44 |
| 8,494,698 B2 * | 7/2013 | Murata | B60K 6/445 701/22 |
| 8,897,946 B2 * | 11/2014 | Kim | B60W 20/10 180/65.265 |
| 2009/0014223 A1 * | 1/2009 | Jones | B60K 17/16 180/65.8 |
| 2014/0333120 A1 | 11/2014 | Pozzo | |

FOREIGN PATENT DOCUMENTS

| | | |
|---|---|---|
| WO | WO2007017221 | 2/2007 |
| WO | WO2007022865 | 3/2007 |
| WO | WO2009086135 | 7/2009 |
| WO | WO2013102484 | 7/2013 |
| WO | WO2017123788 | 8/2017 |
| WO | WO2018130420 | 7/2018 |

OTHER PUBLICATIONS

Linde Material Handling, Linde Brochures, 346 Series Electric Trucks, Date unknown but believed to be at least as early as Aug. 28, 2014, 4 pp.
Turning Power into Motion, Linde Hydraulics Catalog, Oct. 2011, 9 pp.
Actua, Energy Efficiency Technologies, Company Overview, Apr. 2013, 21 pp.
Comparison of the electric drive TAPIO with the electric drive on the basis of asynchronous motor, Evektor, 2014, 2 pp.
High-voltage Electric Axle, Schaeffler Technologies GmbH & Co. KG, 2014, 2 pp.
Sams, et al., "AVL Rotary Range Extender," Fuerex Presentation, Jan. 30, 2013, 33 pp.

* cited by examiner

ELECTRIC TRANSAXLE WITH INTEGRAL POWER GENERATING DEVICE

CROSS-REFERENCE

This application is a divisional application of U.S. patent application Ser. No. 15/640,329, filed on Jun. 30, 2017, which is a continuation-in-part of U.S. patent application Ser. No. 14/838,626, filed on Aug. 28, 2015, now U.S. Pat. No. 9,828,025, which claims the benefit of Provisional App. No. 62/048,518, filed on Sep. 10, 2014, and Provisional App. No. 62/043,274, filed on Aug. 28, 2014. U.S. patent application Ser. No. 15/640,329 also claims priority from Provisional App. No. 62/357,789, filed on Jul. 1, 2016. The terms of all of these prior applications are incorporated herein by reference in their entirety.

BACKGROUND OF THE INVENTION

This invention relates to a drive system for use in vehicles such as lawn and garden tractors, stand-on mowers, walk-behind snow throwers and mowers, and the like, including both single transaxle drives and dual transaxle drives for use in zero-turn applications.

SUMMARY OF THE INVENTION

The invention comprises a transaxle having an electric motor that is controlled by a vehicle user and that drives at least one output axle. The transaxle includes a power generating device that powers the electric motor and a reduction gear train engaged to and driven by the electric motor. The transaxle includes a common housing in which the power generator, the electric motor, and the reduction gear system are each disposed. In dual-axle systems, the transaxle also includes a differential engaged to and driven by the reduction gear system to power a pair of oppositely extending output axles. The differential is also disposed within the common housing.

In further embodiments, a U-shaped or Z-shaped arrangement is used, wherein an input shaft of the generator, which is directly connected to and is driven by a prime mover, through, e.g., a belt and pulley system, is parallel to the output shaft of the electric motor. This arrangement provides for a more compact unit. In further embodiments, a motor controller, or a pair of motor controllers, and a generator controller, may be enclosed in a common housing with the generator and electric drive motor(s).

A better understanding of the invention will be obtained from the following detailed descriptions and accompanying drawings, which set forth illustrative embodiments indicative of the various ways in which the principals of the invention may be employed.

DETAILED DESCRIPTION OF THE DRAWINGS

Figure 1:
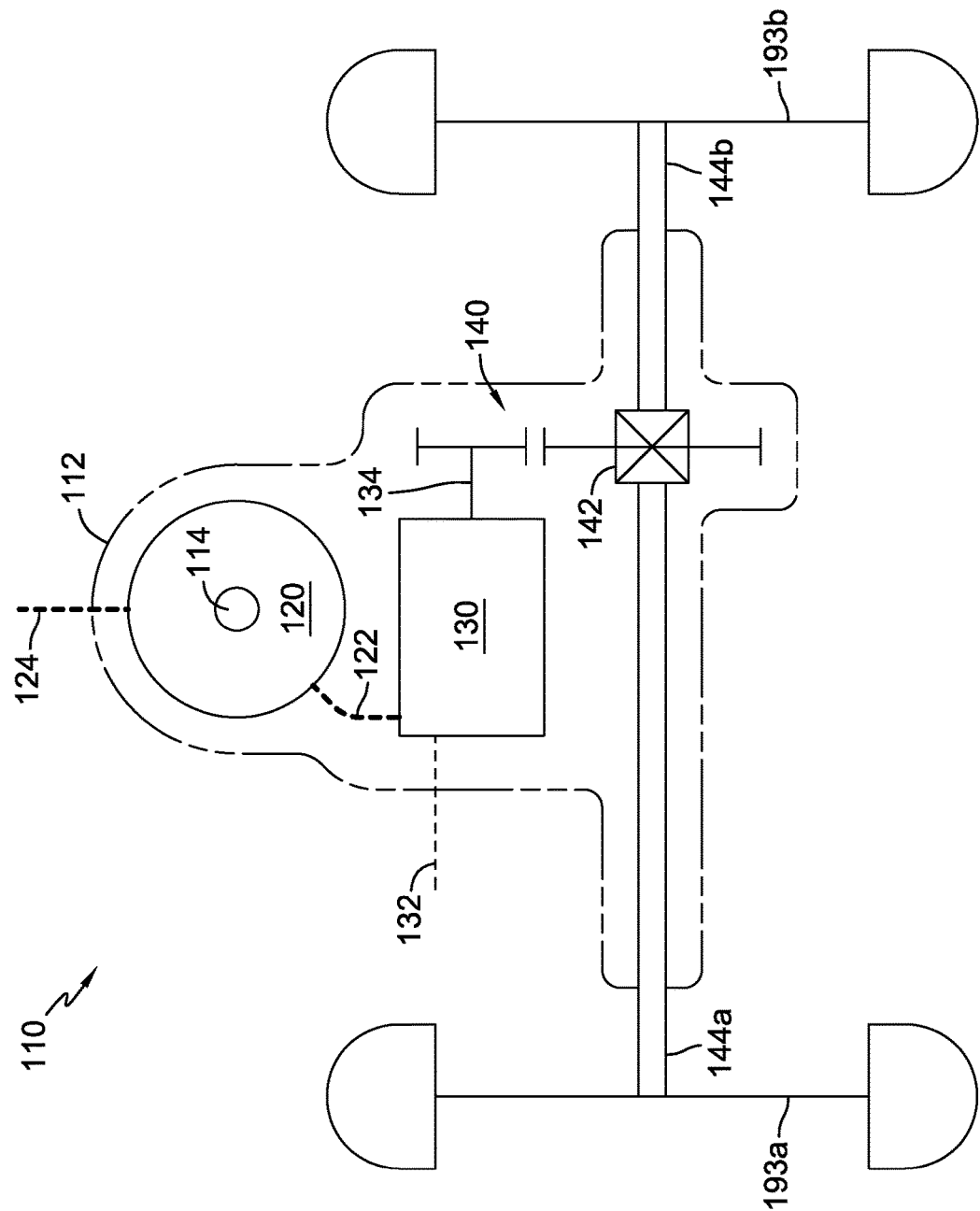
FIG. 1 is a schematic drawing of one embodiment of the transaxle of the present disclosure including a power generating device, an electric motor, a reduction gear train, and a differential all disposed within a common housing.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Referring now to the Figures, FIG. 1 illustrates one embodiment of a transaxle 110 including a power generating device 120, an electric motor 130, a reduction gear train 140, and a differential 142 all disposed within a common transaxle housing 112. The power generating device 120 is powered by an input shaft 114 connected to and driven by a prime mover, such as prime mover 491 in FIG. 4. Power generating device 120 and the other power generating devices depicted herein are shown as generators, although it will be understood that each may alternatively be an alternator or any other suitable device, depending on the end user's needs. The prime mover may also power other outputs, such as a mowing deck or an auger (not shown) for a snow thrower. It will be understood that the power generating devices depicted herein, such as power generating device 120, may use or incorporate a separate controller for purposes of power management.

The power generating device 120 converts the rotation of input shaft 114 into electrical power. Electrical power generated by power generating device 120 is transferred from power generating device 120 to electric motor 130 via conductor 122 (such as suitable wiring) to power electric motor 130, and to a battery such as battery 475 shown in FIG. 4, by means of conductor 124. Using this electrical power, electric motor 130 drives a motor output shaft 134 that is engaged to and drives the reduction gear train 140. The reduction gear train 140 is engaged to differential 142, and provides the desired reduction from the motor output shaft 134 to differential 142. The differential 142 is engaged to and individually controls the output of (i.e., the rotation of) a first axle 144a and an opposing second axle 144b, each of which extends from the common transaxle housing 112. The first axle 144a is engaged to a first wheel 193a configured to rotate therewith, and second axle 144b is engaged to an opposing second wheel 193b configured to rotate therewith.

One or more motor controls can be powered by the power generating device 120 or by a battery, or a combination of the two, and can be used to provide a control signal to electric motor 130 via conductor 132 (such as suitable wiring) to permit a vehicle user to control the electric motor 130.

Figure 2:
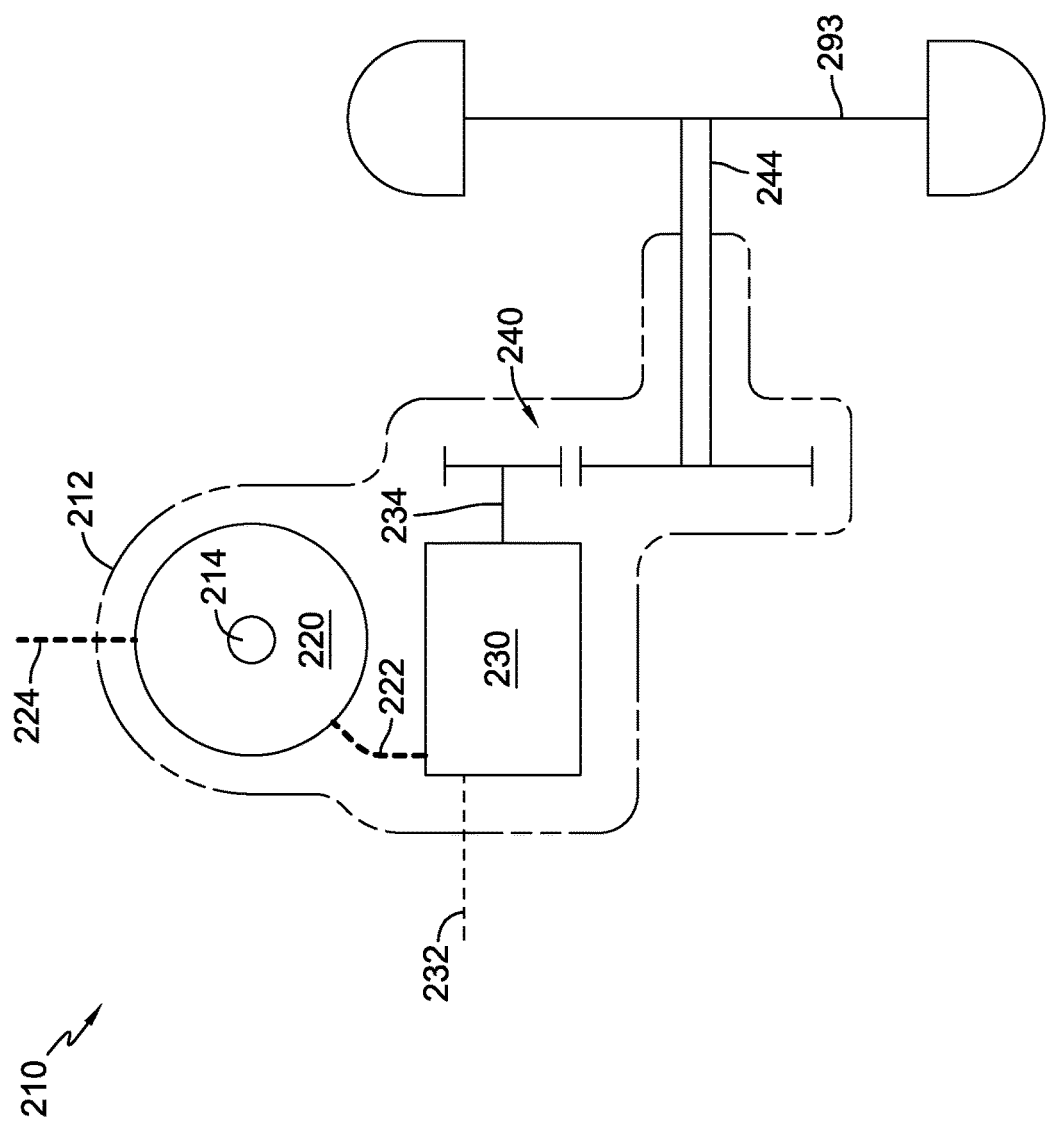
FIG. 2 is a schematic drawing of another embodiment of the transaxle of the present disclosure including a power generating device, an electric motor, and a reduction gear train all disposed within a common housing.

FIG. 2 illustrates another embodiment of a transaxle 210 including a power generating device 220, an electric motor 230, and a reduction gear train 240 all disposed within a common transaxle housing 212. A pair of transaxles 210 may be employed, for instance, in a vehicle having zero-turn capabilities, such as vehicle 690 shown in FIG. 6. The power generating device 220 is powered by an input shaft 214 connected to and driven by a prime mover. The prime mover may also power other outputs, such as a mowing deck or an auger (not shown) for a snow thrower.

The power generating device 220 converts the rotation of input shaft 214 into electrical power. Electrical power generated by power generating device 220 is transferred from power generating device 220 to electric motor 230 via conductor 222 to power electric motor 230, and to a battery such as battery 675 shown in FIG. 6, by means of conductor 224. Using this electrical power, the electric motor 230 drives a motor output shaft 234 that is engaged to and drives the reduction gear train 240. The reduction gear train 240 is engaged to and drives an axle 244, and provides the desired reduction from motor output shaft 234 to axle 244. The axle 244 is engaged to a wheel 293 configured to rotate therewith.

One or more motor controls can be powered by the power generating device 220 or by a battery, or a combination of the two, and can be used to provide a control signal to electric motor 230 via conductor 232 (such as suitable wiring) to permit a vehicle user to control the electric motor 230.

Figure 3:
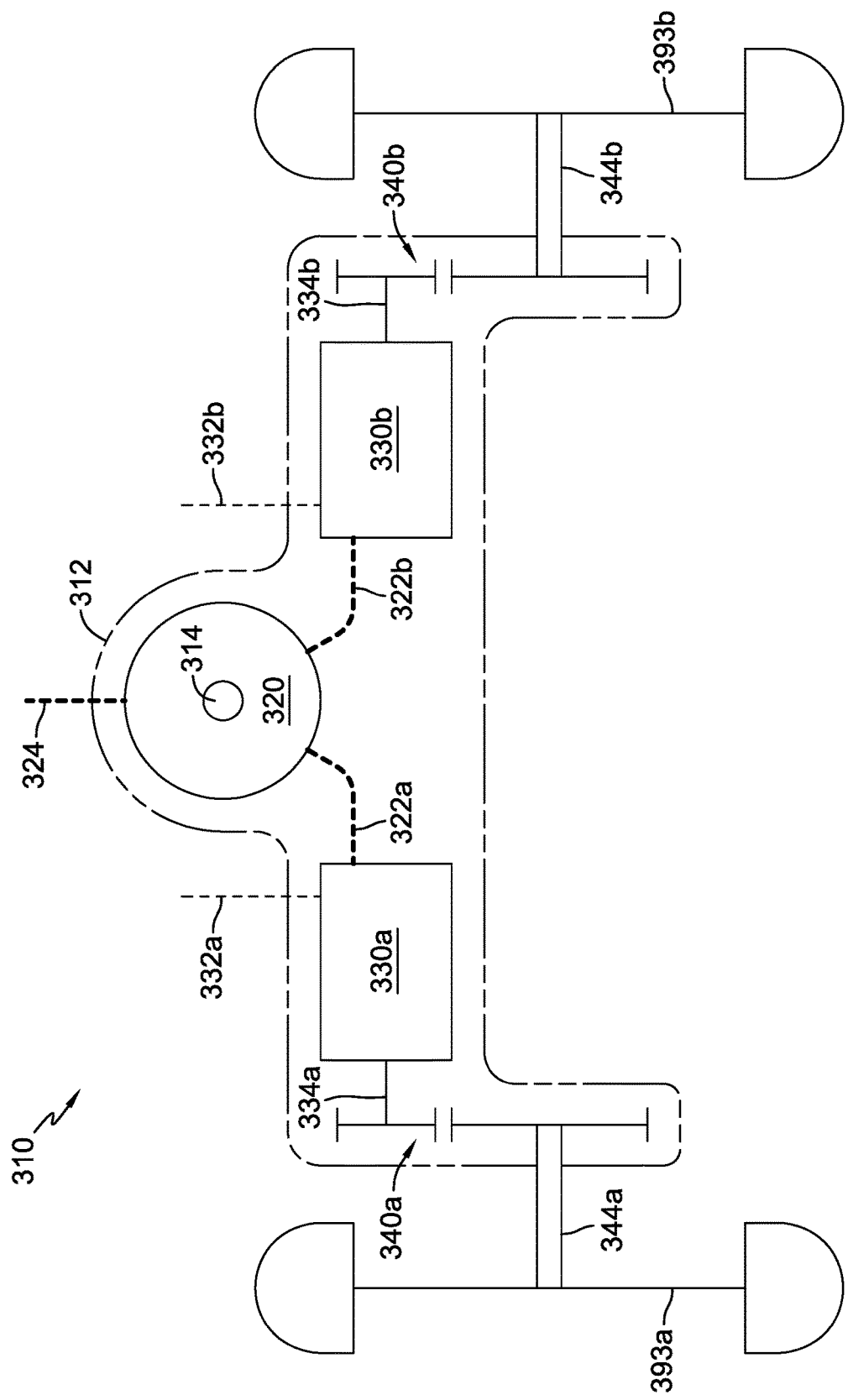
FIG. 3 is a schematic drawing of one embodiment of the transaxle of the present disclosure including a power generating device, two electric motors, and two reduction gear trains all disposed within a common housing.

FIG. 3 illustrates another embodiment of a transaxle 310 including a power generating device 320, a first electric motor 330a, a second electric motor 330b, a first reduction gear train 340a, and a second reduction gear train 340b all disposed within a common transaxle housing 312. The transaxle 310 may be employed, for instance, in a walk-behind mower or snow-thrower. The power generating device 320 is powered by input shaft 314 connected to and driven by a prime mover. The prime mover may also power other outputs, such as a mowing deck or an auger (not shown) for a snow thrower.

The power generating device 320 converts the rotation of input shaft 314 into electrical power. Electrical power generated by power generating device 320 is transferred from power generating device 320 to first electric motor 330a via a first conductor 322a to power electric motor 330a. Electrical power generated by power generating device 320 is also transferred to second electric motor 330b via a second conductor 322b to power the second electric motor 330b, and to a battery such as battery 775 shown in FIG. 7, by means of conductor 324. Using this electrical power, first electric motor 330a drives a first motor output shaft 334a that is engaged to and drives first reduction gear train 340a and second electric motor 330b drives a second motor output shaft 334b that is engaged to and drives second reduction gear train 340b. The first reduction gear train 340a is engaged to and drives a first axle 344a, and provides the desired reduction from first motor output shaft 334a to first axle 344a. The first axle 344a is engaged to a first wheel 393a configured to rotate therewith. Similarly, second reduction gear train 340b is engaged to and drives a second axle 344b, and provides the desired reduction from second motor output shaft 334b to second axle 344b. The second axle 344b is engaged to a second wheel 393b configured to rotate therewith.

One or more motor controls can be powered by the power generating device 320 or by a battery, or a combination of the two, and can be used to provide control signals to first electric motor 330a and second electric motor 330b via conductors 332a, 332b, respectively to permit a vehicle user to control the electric motors 330a, 330b.

Figure 10:
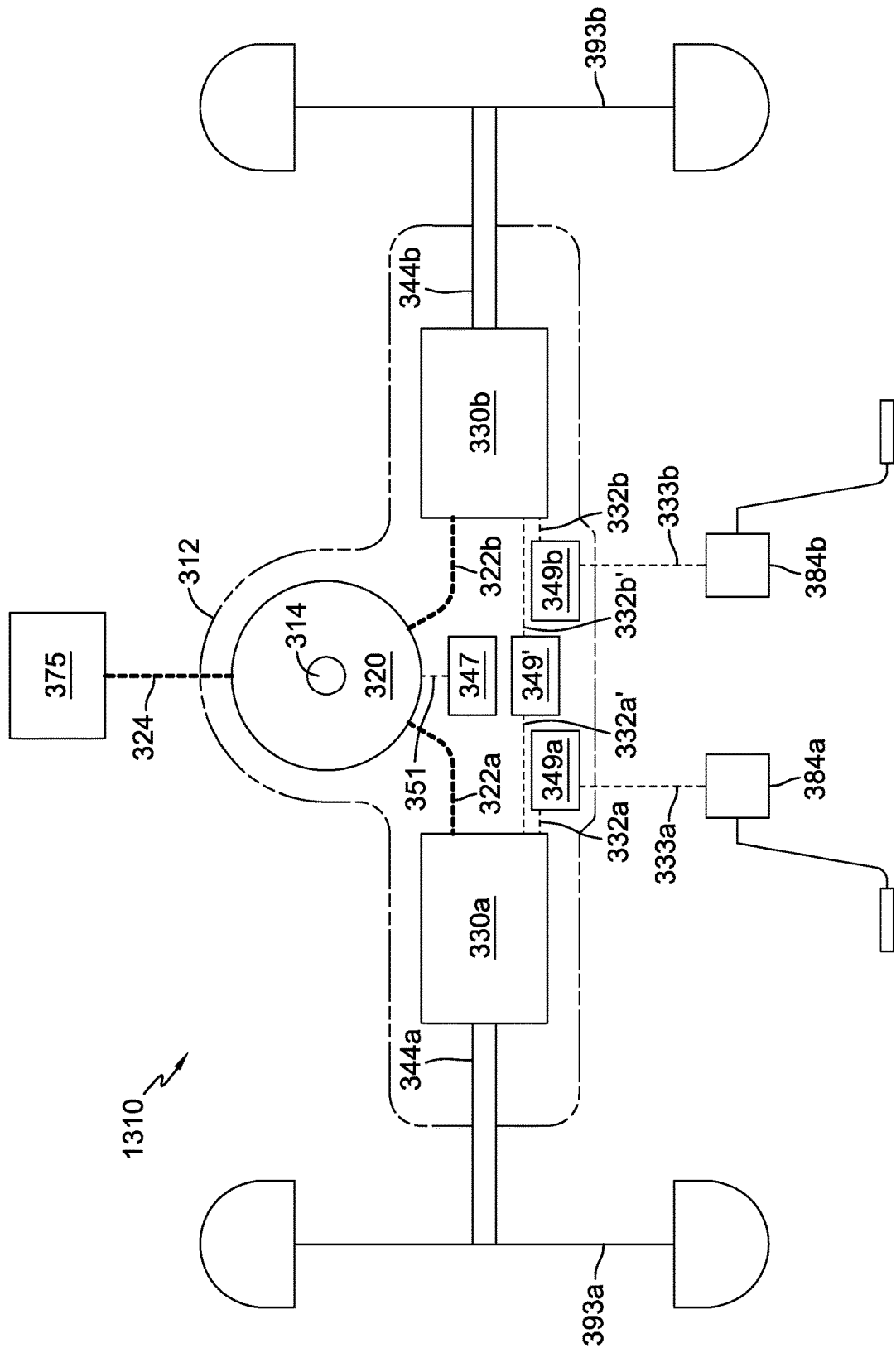
FIG. 10 is a schematic drawing of a further embodiment of the transaxle of the present disclosure including a power generating device and two electric motors disposed within a common housing, wherein the output shaft of each electric motor is directly driving respective drive wheels.

FIGS. 10-13 illustrate further embodiments of this disclosure, to demonstrate the flexibility provided by the compact unit disclosed herein. In FIG. 10, transaxle 1310 includes a power generating device 320, a first electric motor 330a and a second electric motor 330b, all disposed within a common housing 312. The power generating devices disclosed in the various embodiments may be generators, and for convenience are sometimes referred to as such; the controls may be referred to as generator controls for simplicity. In these embodiments in FIGS. 10-13, the housings such as housing 312 may be referred to as transaxle housings or simply as housings.

Certain components of transaxle 1310 may be identical or substantially similar to those components shown in earlier embodiments using common numerals, with minor variations that will be understood by one of ordinary skill in the art. For example, electric motors 330a, 330b are modified from the previously described embodiment in that they are directly driving output axles 344a, 344b, and other components require different wiring connections and the like, and the transaxle housing 312 will be modified accordingly to accommodate the changes described herein.

Power generating device 320 is powered by input shaft 314 connected to and driven by a prime mover, wherein input shaft 314 is perpendicular to the output axles 344a, 344b driven by electric motors 330a, 330b. A generator controller 347 is also disposed inside transaxle housing 312 and controls generator loading and therefore power produced. For example, should the generator controller 347 detect that the voltage of battery 375 is higher than a predetermined threshold (e.g., 12V, 36V or 48V depending on the specific system) and/or battery 375 is approaching a full charge, generator controller 347 can start to back-drive the power generating device 320 and therefore dissipate power. Generator controller 347 can monitor system voltage to determine when to produce electricity to power the electric motors 330a, 330b. Generator controller 347 can be set up to constantly detect and/or calculate the charge of battery 375 to vary the output of power generating device 320 to maintain the desired charge of battery 375. The various batteries described herein, such as battery 375, can be of similar or identical construction and are typical for use in applications such as the vehicles shown herein. Generator controller 347 may be connected to power generating device 320 by means of conductor 351. It will be understood by one of skill in the art that the term "conductor" as used herein may refer to several conductors (e.g. a wiring harness, electrical cable or grouping of conductors serving a singular function).

In FIG. 10, as in prior embodiments, power generating device 320 converts the rotation of input shaft 314 into electrical power. Electrical power generated by power generating device 320 is transferred via a first conductor 322a to power first electric motor 330a. Electrical power generated by power generating device 320 is also transferred via a second conductor 322b to power the second electric motor 330b, and to battery 375 by means of conductor 324. Using this electrical power, first electric motor 330a drives a first output axle 344a that is engaged to and drives first wheel 393a and second electric motor 330b drives a second motor output axle 344b that is engaged to and drives second wheel 393b.

A pair of motor controllers 349a, 349b can be disposed inside transaxle housing 312 and connected to respective electric motors 330a, 330b using conductors 332a, 332b. These motor controllers 349a, 349b are connected to respective operator control devices 384a, 384b by means of conductors 333a, 333b, and can be used to control the speed and direction of electric motors 330a, 330b, as well as control such factors as top speed, forward and reverse speed and acceleration, and various safety features. Operator control devices 384a, 384b are depicted in this embodiment as control levers and may incorporate position sensor modules as described in connection with other embodiments. For purposes of this disclosure, speed control mechanisms or "operator control devices" 384a, 384b, and the like may include any or all of the speed control mechanisms, features and functionality described in U.S. patent application Ser. No. 15/377,706, filed Dec. 13, 2016, which is incorporated by reference herein in its entirety.

It will be understood that the pair of motor controllers 349a, 349b could be replaced with a single motor controller such as motor controller 349' shown as an alternative embodiment in FIG. 10, and separately connected to each electric motor 330a, 330b by conductors 332a' and 332b'.

By way of example, motor controllers 349a, 349b can be programmed to provide a relatively slow initial acceleration, and can detect wheel slippage (e.g., on wet turf). By combining the motor controllers 349a, 349b and the generator controller 347 inside transaxle housing 312, a more compact unit is provided. Motor controllers 349a, 349b can also operate the electric motors 330a, 330b to act as generators to slow or stop the vehicle.

Motor controllers 349a, 349b can additionally receive inputs from other sensors, including but not limited to vehicle slope sensors. Should a vehicle slope sensor detect an excessive slope of the vehicle, motor controllers 349a, 349b can either stop the electric motors 330a, 330b or alternately reverse the electric motors 330a, 330b to back the vehicle away from the excessive slope. As can be appreciated, the use of motor controllers 349a, 349b can provide almost instantaneous feedback with regard to operator input and sensor inputs. It will be understood that the generator controllers and motor controllers shown in FIGS. 10-13 can be connected to operator control devices and sensors on a vehicle such as those shown in later figures by means of standard wiring (not shown). It will further be understood that the motor controllers and generator controllers shown in other embodiments, including FIGS. 11-13, can operate in a manner similar to that described above.

Figure 10A:
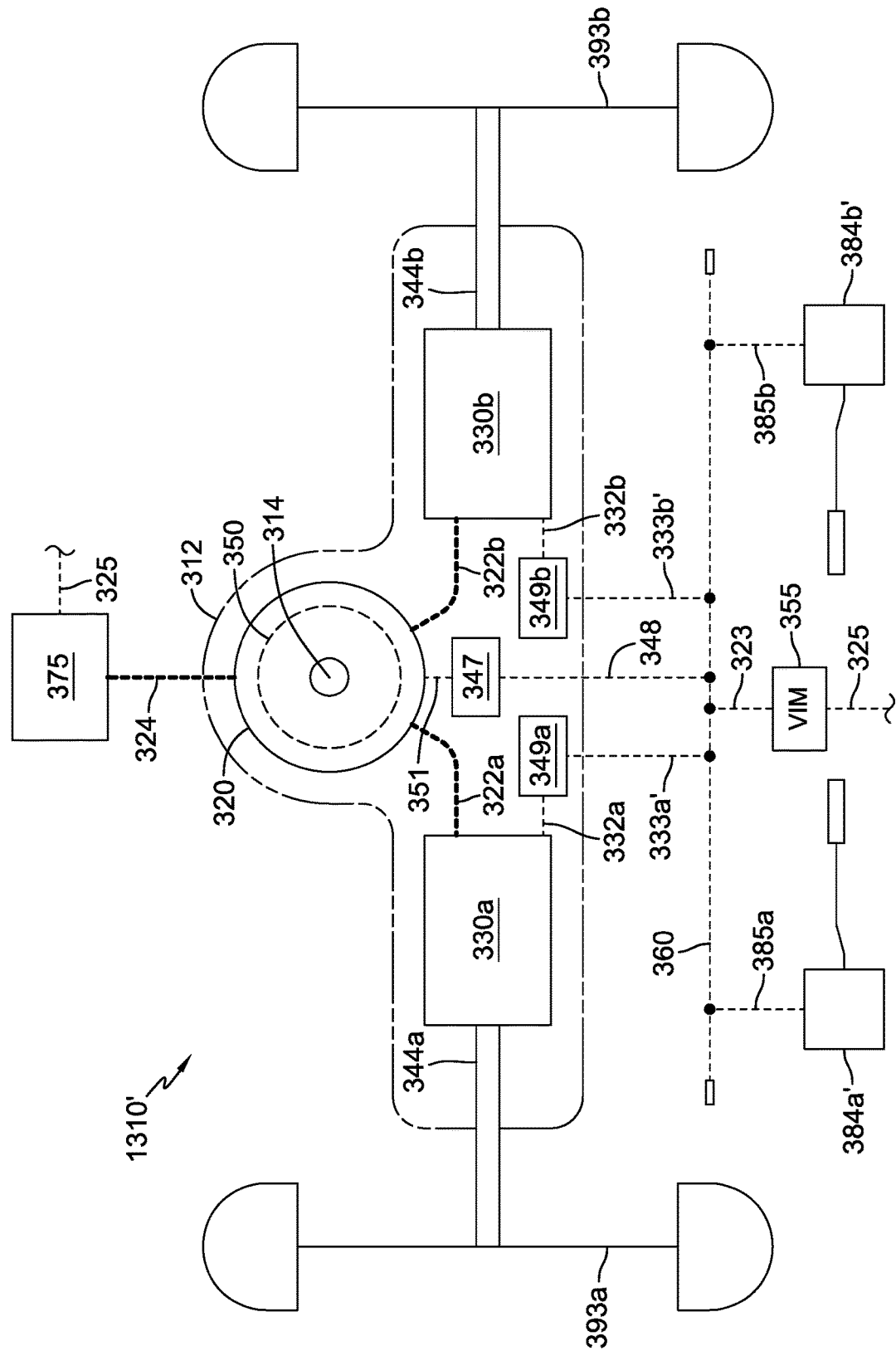
FIG. 10A is a schematic drawing of an embodiment similar to that shown in FIG. 10, with details of an alternative control apparatus shown.
Figure 14:
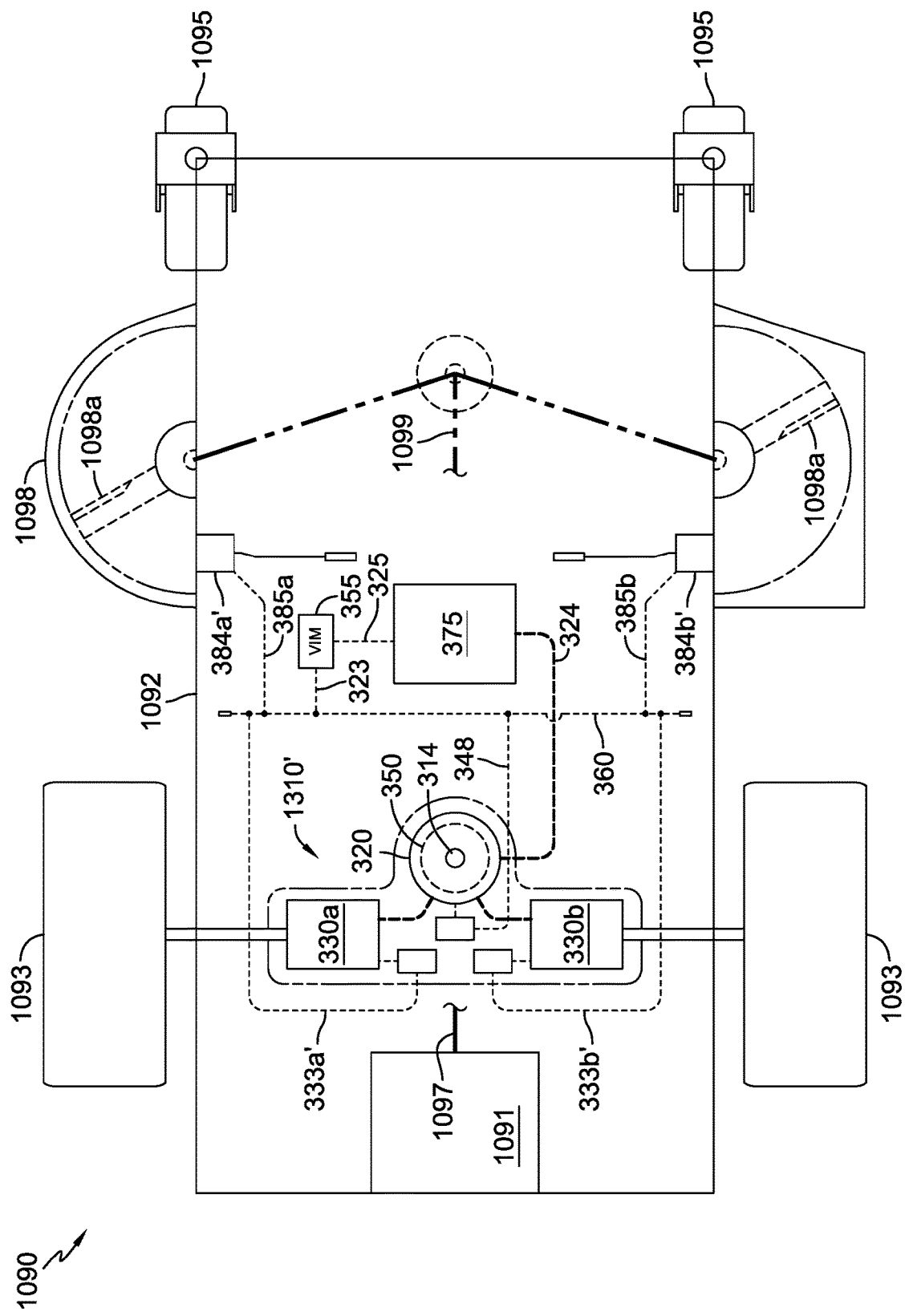
FIG. 14 is top plan view of a zero-turn vehicle incorporating the transaxle depicted in FIG. 10A.

FIG. 10A illustrates an embodiment similar to that shown in FIG. 10, but also depicting the transaxle 1310' connected to a CAN-Bus 360 that is connected to a Vehicle Integration Module (VIM) 355 for providing control of the components of transaxle 1310'. VIM 355 is connected to CAN-Bus 360 by means of a conductor 323 and to battery 375 by means of a conductor 325. CAN-Bus 360 may be connected to motor controllers 349a, 349b by means of conductors 333a', 333b' and to generator controller 347 by means of conductor 348. Operator controls 384a' and 384b', which may be similar to those described for FIG. 10, and comprising position sensor modules, may also be connected to CAN-Bus 360 by means of conductors 385a and 385b. More details on such a CAN-Bus and VIM system can be found in commonly owned application Ser. No. 15/640,300 filed on the same date herewith, now U.S. Pat. No. 10,058,031, the terms of which are incorporated herein by reference in their entirety. A PTO (power take off) clutch-brake assembly 350 is also provided in this embodiment integrally formed with or attached to power generating device 320 for connecting a vehicle prime mover to a mowing deck or other powered implement via power generating device 320 as is shown in FIG. 14.

Figure 11:
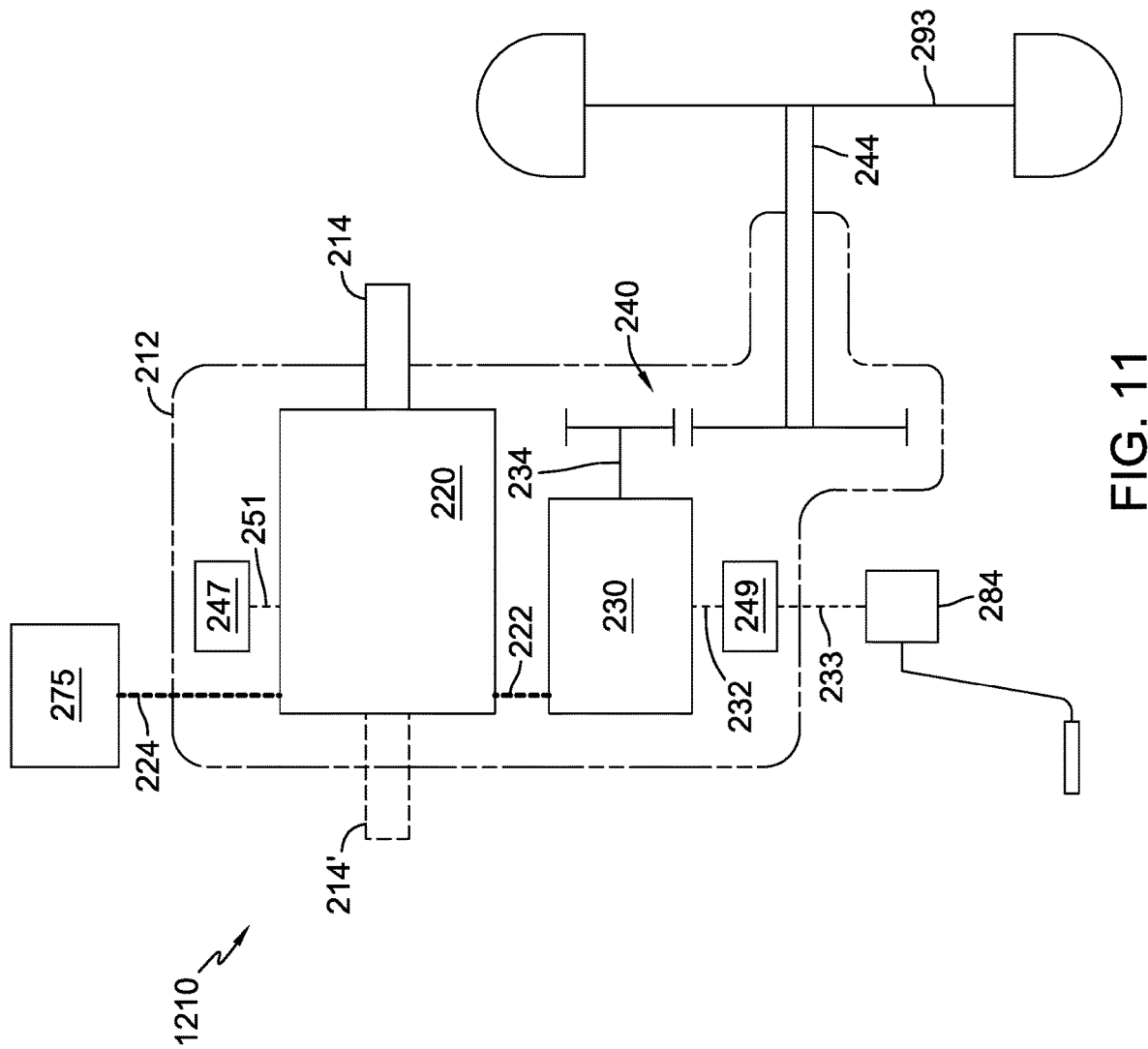
FIG. 11 is a schematic drawing of a further embodiment of the transaxle of the present disclosure including a power generating device and an electric motor in a U-shaped or Z-shaped arrangement and disposed within a common housing with a reduction gear train.

FIG. 11 illustrates a further embodiment of this disclosure, where transaxle 1210 includes a power generating device 220, an electric motor 230, and a reduction gear train 240 all disposed within a common transaxle housing 212. A pair of transaxles 1210 may be employed, for instance, in a vehicle having zero-turn capabilities, such as vehicle 690 shown in FIG. 6. The power generating device 220 is powered by an input shaft 214 connected to and driven by a prime mover, and in this embodiment, input shaft 214 is mounted parallel to output shaft 234 and axle 244, and on the same side of transaxle housing 212 as output axle 244. The components of the embodiment of FIG. 11 may be identical or substantially similar to the components having common numerals as shown in, e.g., FIG. 2, with modifications that will be understood by a person of ordinary skill in the art. For example, different wiring connections will be required, and transaxle housing 212 will be modified to accommodate the different arrangement of components.

The power generating device 220 converts the rotation of input shaft 214 into electrical power. Electrical power generated by power generating device 220 is transferred from power generating device 220 to electric motor 230 via conductor 222 to power electric motor 230, and to battery 275 by means of conductor 224. Electric motor 230 drives a motor output shaft 234 that is engaged to and drives the reduction gear train 240. The reduction gear train 240 is engaged to and drives an axle 244, and provides the desired reduction from motor output shaft 234 to axle 244. The axle 244 is engaged to a wheel 293 configured to rotate therewith. It will also be understood that with some additional modifications of transaxle housing 212, power generating device 220 could be aligned in transaxle housing 212 such that the input shaft extends out the opposite side of transaxle housing 212 (i.e., on the opposite side of the transaxle housing 212 from which 244 extends), as shown by alternative input shaft 214'.

A motor controller 249 may be placed inside transaxle housing 212 and can be powered by the power generating device 220 or by battery 275, or a combination of the two, and can be used to provide a control signal to electric motor 230 via conductor 232 (such as suitable wiring) to permit a vehicle user to control the electric motor 230, by means of an operator control device such as control lever 284 connected thereto by conductor 233. Similarly, generator controller 247 is disposed inside transaxle housing 212 and connected to power generating device 220 by conductor 251; generator controller 247 operates in a manner similar to that described for generator controller 347 in FIG. 10, including providing the ability to back-drive the power generating device 220 as required when, for example, battery 275 is reaching a full charge. Similarly, motor controller 249 can also operate electric motor 230 to act as a generator to slow or stop the vehicle.

Figure 12:
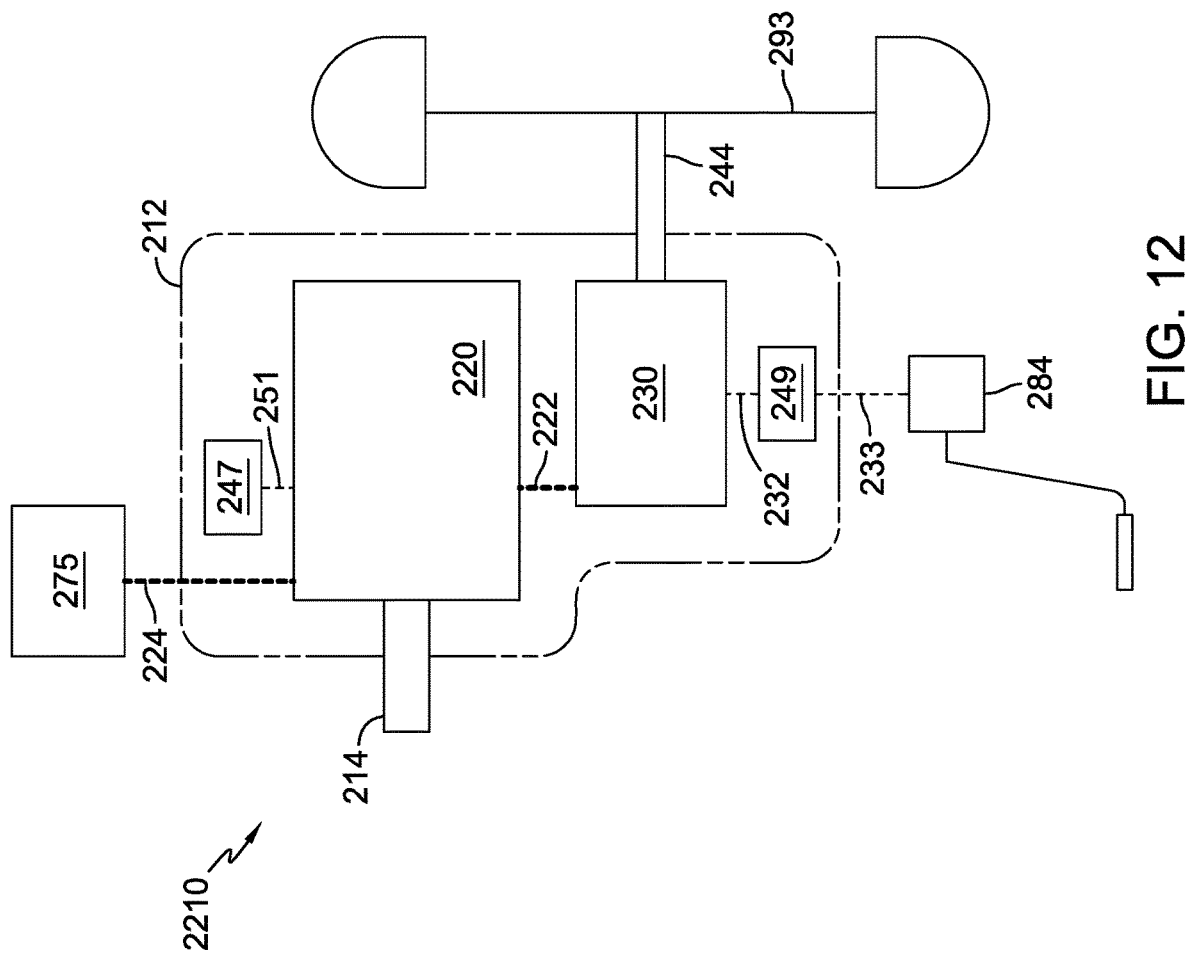
FIG. 12 is a schematic drawing of a further embodiment of the transaxle of the present disclosure including a power generating device and an electric motor in a Z-shaped arrangement and disposed within a common housing, where an output shaft of the electric motor is directly driving a drive wheel.

FIG. 12 illustrates a further embodiment of this disclosure, where transaxle 2210 includes a power generating device 220 and an electric motor 230 disposed within a common transaxle housing 212, but without a reduction gear train. The power generating device 220 is powered by an input shaft 214 connected to and driven by a prime mover. In this embodiment, input shaft 214 is mounted parallel to output axle 244, but extending from transaxle housing 212 on the opposite side from output axle 244. Again, as noted above, it will be understood that transaxle housing 212 and other components such as electric motor 230 will be modified to accommodate the changes described herein.

The power generating device 220 converts the rotation of input shaft 214 into electrical power, which is transferred to electric motor 230 via conductor 222 to power electric motor 230, and to battery 275 by means of conductor 224. Electric motor 230 drives a motor output axle 244 that is engaged to and directly drives wheel 293. Electric motor 230 and motor controller 249 can be powered by the power generating device 220 or by battery 275, or a combination of the two, and motor controller 249 can be used to provide a control signal to electric motor 230 via conductor 232 (such as suitable wiring) to permit a vehicle user to control the electric motor 230 by means of an operator control device such as control lever 284 connected thereto by conductor 233.

As before, generator controller 247 is disposed inside transaxle housing 212 and connected to power generating device 220 by conductor 251; generator controller 247 operates in a manner similar to that described for generator controller 347 in FIG. 10, including providing the ability to back-drive the power generating device 220 as required when, for example, battery 275 is reaching a full charge. Similarly, motor controller 249 can also operate electric motor 230 to act as a generator to slow or stop the vehicle.

Figure 13:
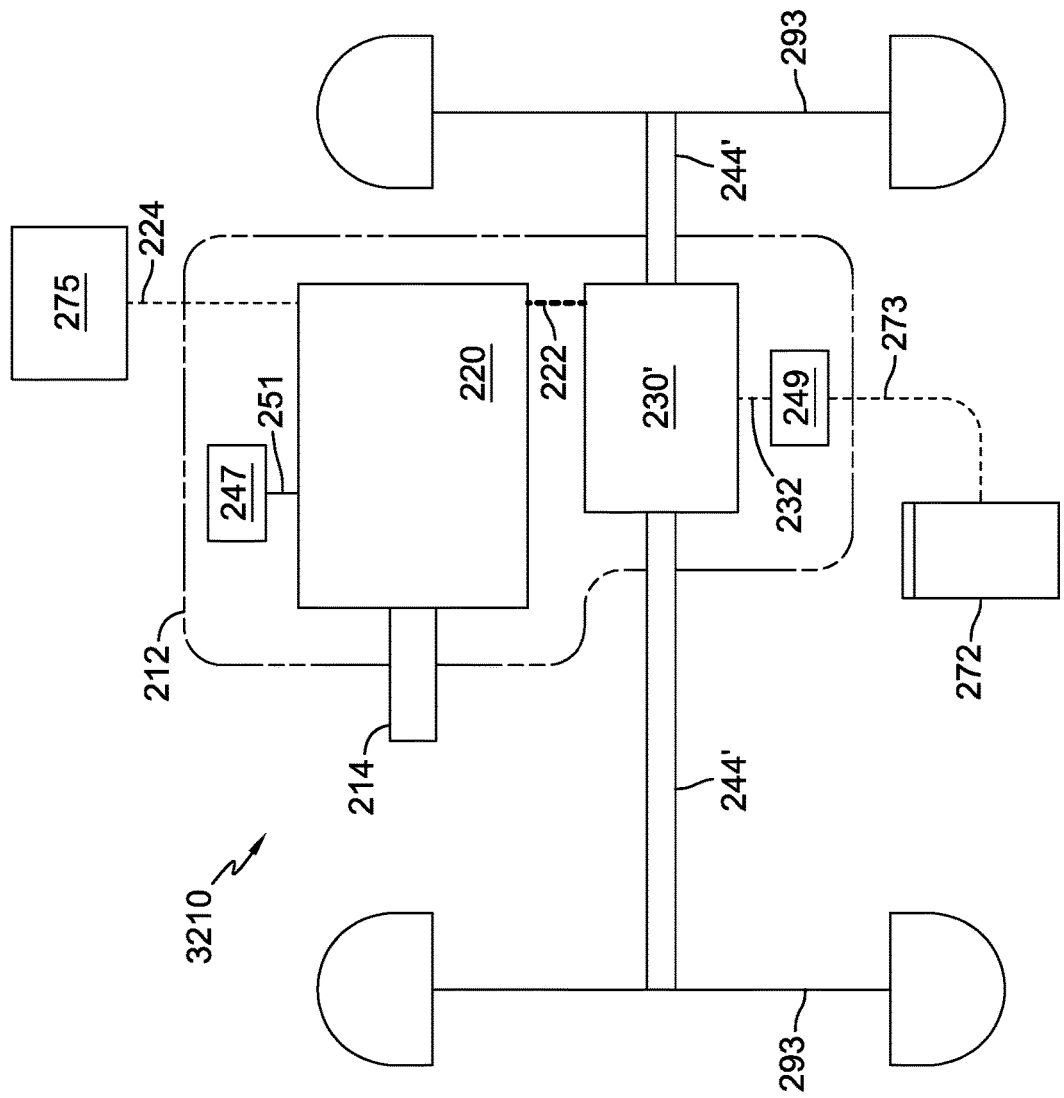
FIG. 13 is a schematic drawing of a further embodiment of the transaxle of the present disclosure including a power generating device and an electric motor disposed within a common housing, where an output shaft of the electric motor consists of a through shaft to directly drive two separate drive wheels.

FIG. 13 illustrates a further embodiment of this disclosure, where transaxle 3210 includes a power generating device 220 and an electric motor 230' disposed within a common transaxle housing 212. In this embodiment, motor output axle 244' consists of a through shaft extending out both sides of electric motor 230' to drive both wheels 293. Such a device may be used, for example, in a walk behind snow thrower or the like where differential transaxle output or zero turn operation is not required. The power generating device 220 is powered by an input shaft 214 connected to and driven by a prime mover, and in this embodiment, input shaft 214 is mounted parallel to motor output axle 244'.

The power generating device 220 converts the rotation of input shaft 214 into electrical power. Electrical power generated by power generating device 220 is transferred from power generating device 220 to electric motor 230' via conductor 222 to power electric motor 230', and to battery 275 by means of conductor 224. Using this electrical power, the electric motor 230' drives a motor output axle 244' that is engaged to and directly drives both wheels 293.

As in prior embodiments, electric motor 230' and motor controller 249 can be powered by the power generating device 220 or by battery 275, or a combination of the two, and motor controller 249 can be used to provide a control signal to electric motor 230' via conductor 232 (such as suitable wiring) to permit a vehicle user to control the electric motor 230' by means of an operator control device such as a hand controlled accelerator (e.g. motorcycle-style twist throttle) or foot pedal 272 connected thereto by conductor 273. Generator controller 247 is disposed inside transaxle housing 212 and connected to power generating device 220 by conductor 251; generator controller 247 operates in a manner similar to that described for generator controller 347 in FIG. 10, including providing the ability to back drive the power generating device 220 as required when, for example, battery 275 is reaching a full charge. Similarly, motor controller 249 can also operate electric motor 230' to act as a generator to slow or stop the vehicle.

Figure 4:
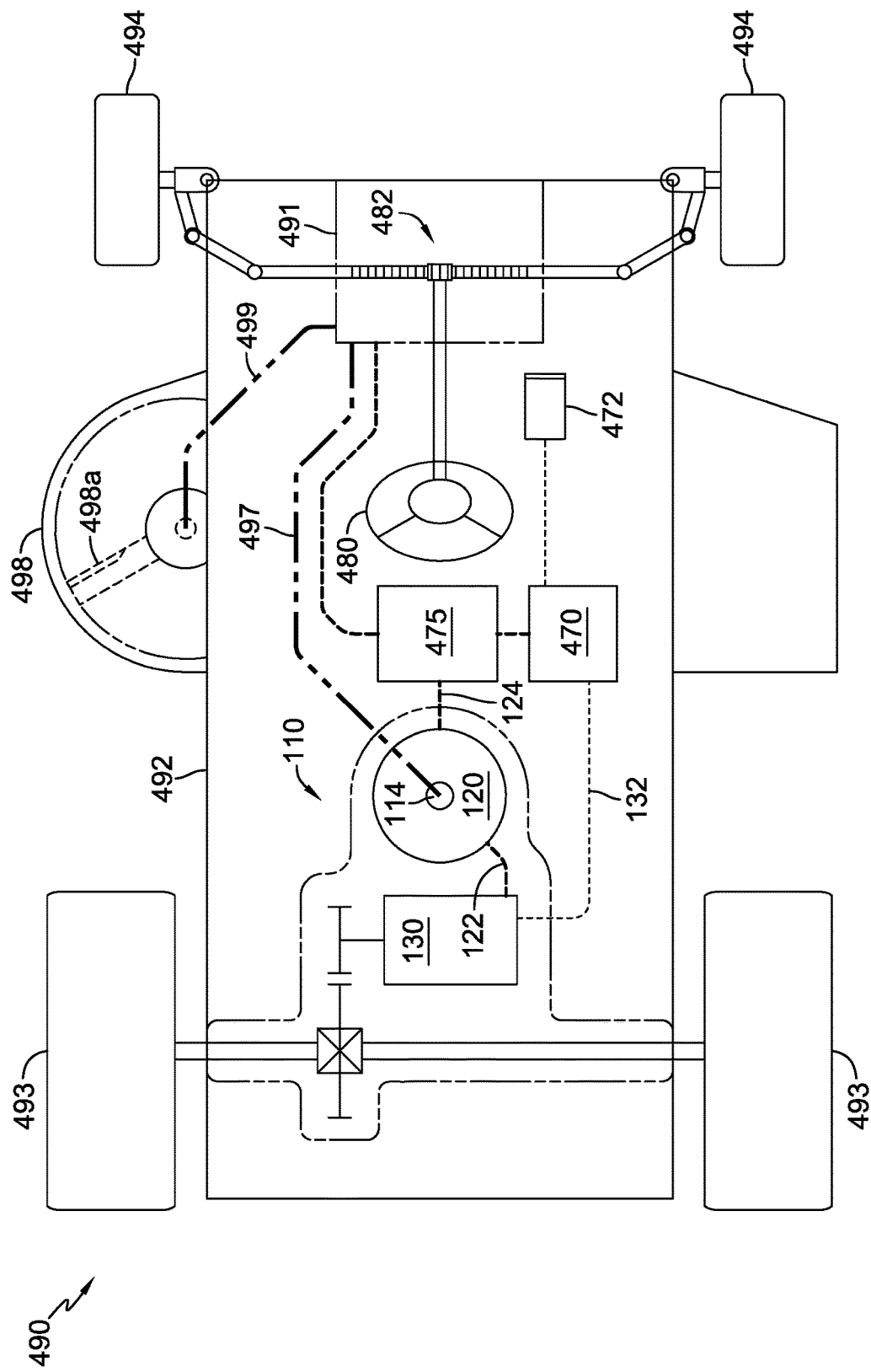
FIG. 4 is a top plan view of a riding vehicle including the transaxle of FIG. 1 and a mechanical steering mechanism.

FIG. 4 illustrates a riding vehicle 490 including the transaxle 110 and a frame 492 that supports the transaxle 110. The vehicle 490 includes a prime mover 491 supported by the frame 492 and configured to drive the input shaft 114 of the transaxle 110, which in turn powers the power generating device 120 of transaxle 110 (as described above in conjunction with FIG. 1). In this embodiment, vehicle 490 includes a belt and pulley assembly 497 that operably connects prime mover 491 to input shaft 114 of transaxle 110 such that prime mover 491 may drive input shaft 114, though any other suitable power transfer device or system may be employed. Prime mover 491 also powers one or more blades 498a of a mowing deck 498 supported by frame 492 of vehicle 490. In this embodiment, vehicle 490 includes a belt and pulley assembly 499 that operably connects prime mover 491 to mowing deck 498 such that prime mover 491 may drive blade(s) 498a, though any other suitable power transfer device or system may be employed.

Vehicle 490 also includes a controller 470 operatively connected to electric motor 130 of transaxle 110 and an accelerator pedal 472 (or other suitable operator control device) operatively connected to controller 470. Controller 470 and accelerator pedal 472 enable the vehicle user to control the electric motor 130 of transaxle 110. More specifically, in this embodiment, when the vehicle user actuates (or releases) the accelerator pedal 472, the controller 470 sends an appropriate control input to the electric motor 130 of the transaxle 110 to modify the output of the electric motor 130 and, therefore, the output of the transaxle 110, accordingly. Controller 470 is powered by a battery 475 powered by power generating device 120, though in other embodiments, controller 470 is powered by a combination of battery 475 and the power generating device 120 or solely by the power generating device 120.

Vehicle 490 also includes rear wheels 493 and front wheels 494. The rear wheels 493 are engaged to and driven by transaxle 110 (as described above in conjunction with FIG. 1). The front wheels 494 are engaged to a steering mechanism 482 supported by frame 492. The steering mechanism 482 includes a steering wheel 480 and a plurality of mechanical linkages linking front wheels 494 to steering wheel 480 such that rotating the steering wheel 480 causes the front wheels 494 to rotate accordingly.

Figure 5:
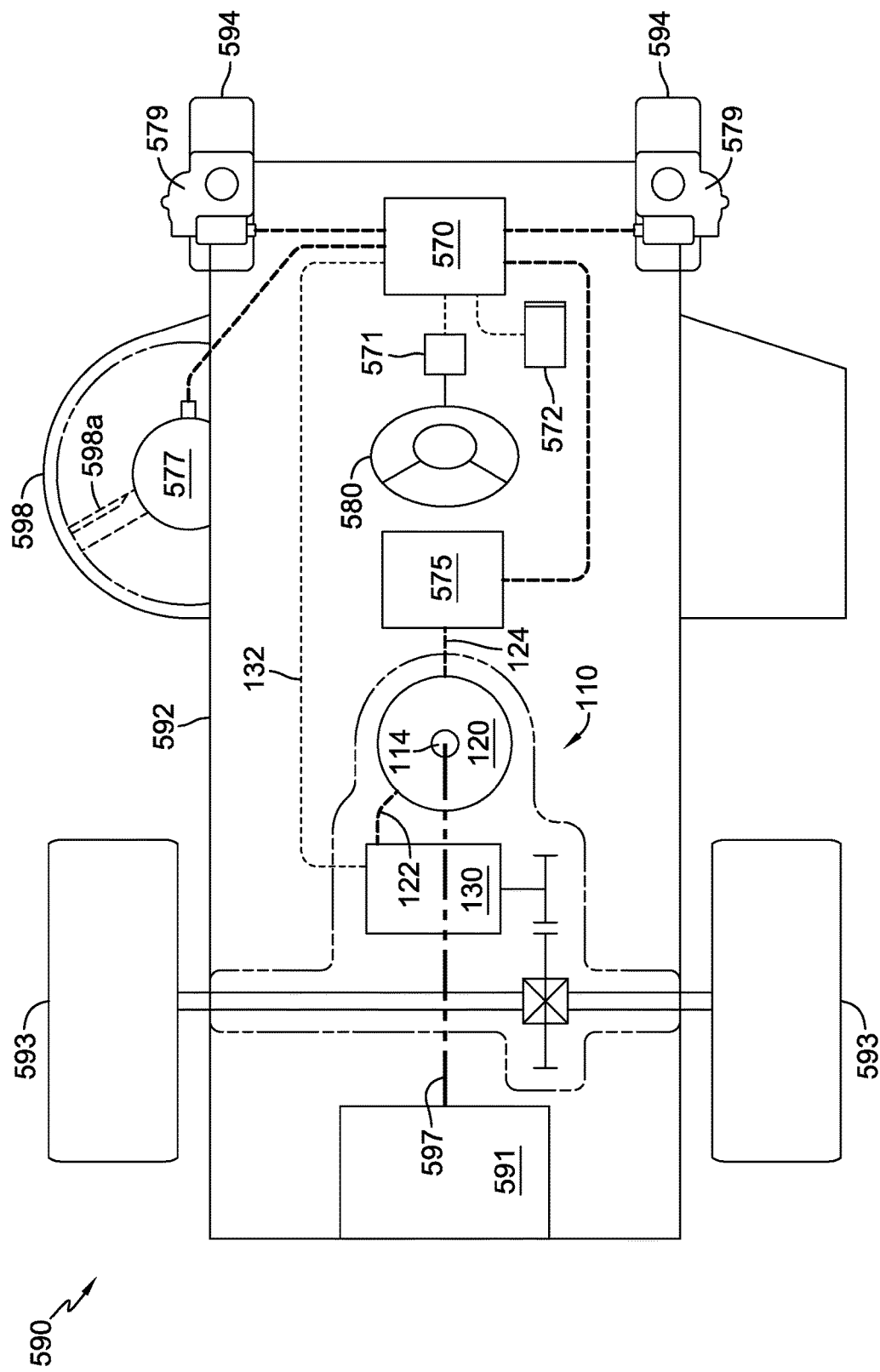
FIG. 5 is a top plan view of a riding vehicle including the transaxle of FIG. 1 and electronically-controlled steering.

FIG. 5 illustrates a riding vehicle 590 including the transaxle 110 and a frame 592 that supports the transaxle 110. Vehicle 590 includes a prime mover 591 supported by frame 592 and configured to drive input shaft 114 of transaxle 110, which in turn powers the power generating device 120 of transaxle 110 (as described above in conjunction with FIG. 1). In this embodiment, vehicle 590 includes a belt and pulley assembly 597 that operably connects prime mover 591 to input shaft 114 of transaxle 110 such that prime mover 591 may drive input shaft 114, though any other suitable power transfer device or system may be employed.

Vehicle 590 also includes a controller 570 operatively connected to electric motor 130 of transaxle 110 and an accelerator pedal 572 (or other suitable operator control device) operatively connected to the controller 570. The controller 570 and the accelerator pedal 572 enable the vehicle user to control electric motor 130 of transaxle 110. More specifically, in this embodiment, when the vehicle user actuates (or releases) the accelerator pedal 572, the controller sends an appropriate control input to the electric motor 130 of transaxle 110 to modify the output of the electric motor 130 and, therefore, the output of the transaxle 110, accordingly. Controller 570 is powered by a battery 575 supported by frame 592 and powered by the power generating device 120, though in other embodiments the controller 570 is powered by a combination of battery 575 and the power generating device 120 or solely by the power generating device 120.

Vehicle 590 also includes rear wheels 593 and front wheels 594. The rear wheels 593 are engaged to and driven by transaxle 110 (as described above in conjunction with FIG. 1). Each front wheel 594 is engaged to an electric actuator 579 which is configured to rotate that particular front wheel 594 about an appropriate vertical axis to provide steering. The electric actuators 579 are operatively connected to controller 570 such that controller 570 may control the electric actuators 579. Vehicle 590 includes a steering wheel 580 and a steering position sensor 571 operatively connected to steering wheel 580 and controller 570. In operation, steering position sensor 571 senses and communicates a rotation of the steering wheel 580 to controller 570, which controls the electric actuators 579 to cause the front wheels 594 to rotate according to the rotation of steering wheel 580.

Vehicle 590 also includes a mowing deck 598 supported by frame 592 and one or more auxiliary electric motors 577 operatively connected to and configured to rotate one or more blades 598*a* of mowing deck 598. In this embodiment, the one or more auxiliary electric motors 577 are operatively connected to controller 570, and the necessary operator switches as may be required, such that the vehicle user may control operation of the one or more electric motors 577 and, therefore, rotation of blade(s) 598*a*, using controller 570. In certain embodiments, each blade is operatively connected to a separate electric motor that is configured to rotate that particular blade. In other embodiments, the vehicle includes fewer electric motors than it does blades. In these embodiments, certain of the blades may be directly driven by the electric motors while other of the blades may be driven by the electric motors via any suitable power transfer device or system operatively connecting the electric motors to the blades.

Figure 6:
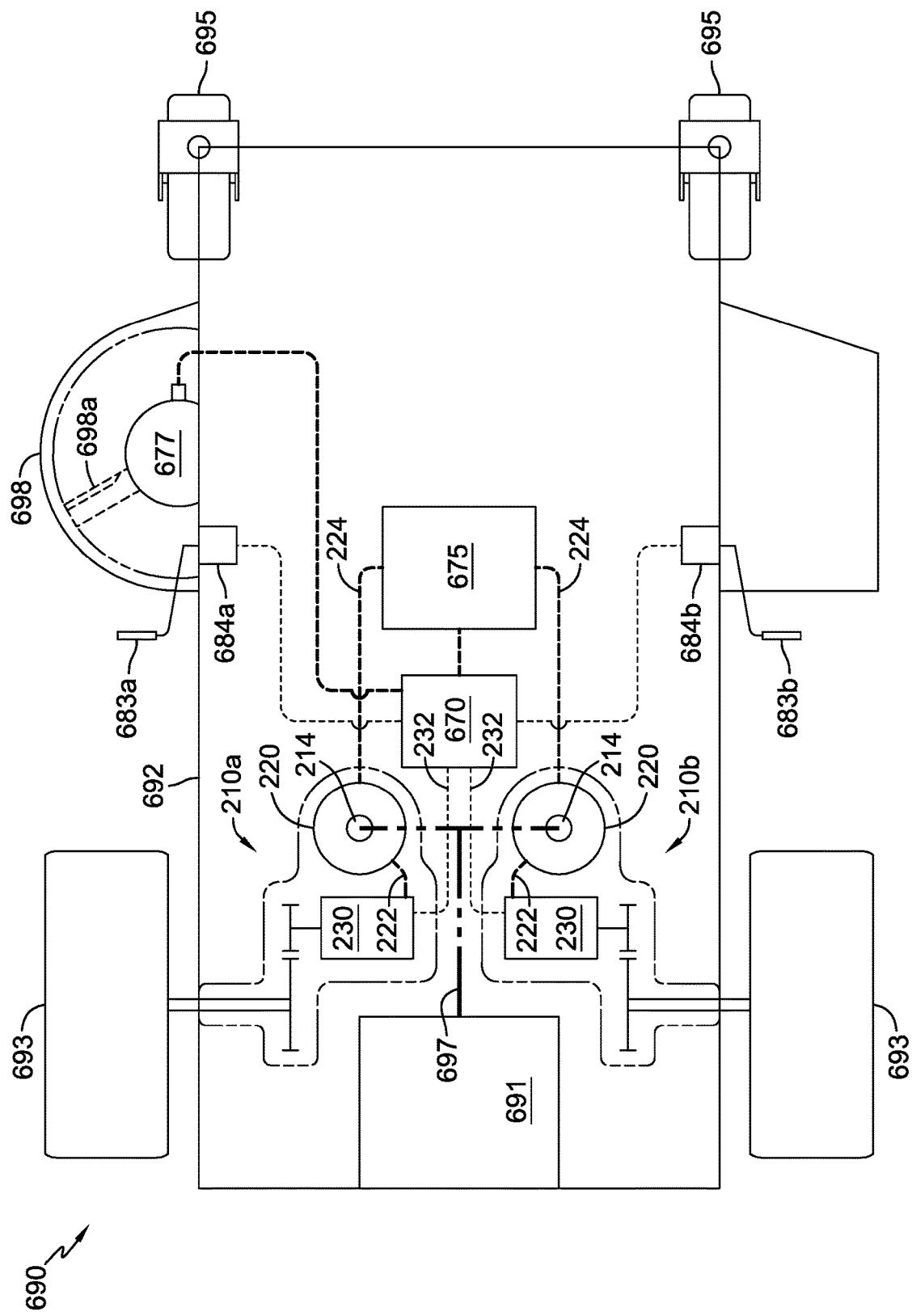
FIG. 6 is a top plan view of a riding zero-turn vehicle including two of the transaxles as shown in FIG. 2.

FIG. 6 illustrates a zero-turn vehicle 690 including two transaxles 210*a* and 210*b* and a frame 692 that supports transaxles 210*a* and 210*b*. Vehicle 690 includes a prime mover 691 supported by frame 692 and configured to drive the input shafts 214 of transaxles 210*a* and 210*b*, which in turn power the power generating devices 220 of the transaxles 210*a* and 210*b* (as described above in conjunction with FIG. 2). In this embodiment, vehicle 690 includes a belt and pulley assembly 697 that operably connects prime mover 691 to input shafts 214 of transaxles 210*a* and 210*b* such that prime mover 691 may drive input shafts 214, though any other suitable power transfer device or system may be employed.

Vehicle 690 also includes two control levers 683*a* and 683*b* (or other suitable operator control devices), two position sensors 684*a* and 684*b* operatively connected to the respective control levers 683*a* and 683*b* such that position sensors 684*a* and 684*b* may detect the positions of the corresponding control levers 683*a* and 683*b*, and a controller 670 operatively connected to position sensors 684*a* and 684*b*. The control lever 683*a*, the position sensor 684*a*, and the controller 670 enable the vehicle user to control the electric motor 230 of transaxle 210*a*, and the control lever 683*b*, the position sensor 684*b*, and the controller 670 enable the vehicle user to separately control the electric motor 230 of transaxle 210*b*. More specifically, in this embodiment, when the vehicle user moves control lever 683*a* (or 683*b*) to a particular position, position sensor 684*a* (or 684*b*) communicates this position to controller 670, which in turn sends an appropriate control input to electric motor 230 of transaxle 210*a* (or 210*b*) to modify the output of the electric motor 230 and, therefore, the output of transaxle 210*a* (or 210*b*), accordingly. Controller 670 is powered by a battery 675 which is connected to and powered by the power generating devices 220 of transaxles 210*a* and 210*b*, though in other embodiments the controller 670 may be powered by a combination of the battery 675 and the power generating devices 220 of transaxles 210*a* and 210*b*, solely by the power generating devices 220 of the transaxles 210*a* and 210*b*, or by the power generating device 220 of only one of the transaxles 210*a* and 210*b*.

Vehicle 690 also includes rear wheels 693 and front casters 695. One of the rear wheels 693 is engaged to and driven by transaxle 210*a* (as described above in conjunction with FIG. 2) and another one of the rear wheels 693 is engaged to and separately driven by the transaxle 210*b* (as described above in conjunction with FIG. 2).

Vehicle 690 also includes a mowing deck 698 supported by frame 692 and one or more auxiliary electric motors 677 operatively connected to and configured to rotate one or more blades 698*a* of mowing deck 698. In this embodiment, the one or more auxiliary electric motors 677 are operatively connected to controller 670, and the necessary operator switches as may be required, such that the vehicle user may control operation of the one or more electric motors 677 and, therefore, rotation of blade(s) 698a, using controller 670. In certain embodiments, each blade is operatively connected to a separate electric motor that is configured to rotate that particular blade. In other embodiments, the vehicle includes fewer electric motors than it does blades. In these embodiments, certain of the blades may be directly driven by the electric motors while other of the blades may be driven by the electric motors via any suitable power transfer device or system operatively connecting the electric motors to the blades.

Figure 9:
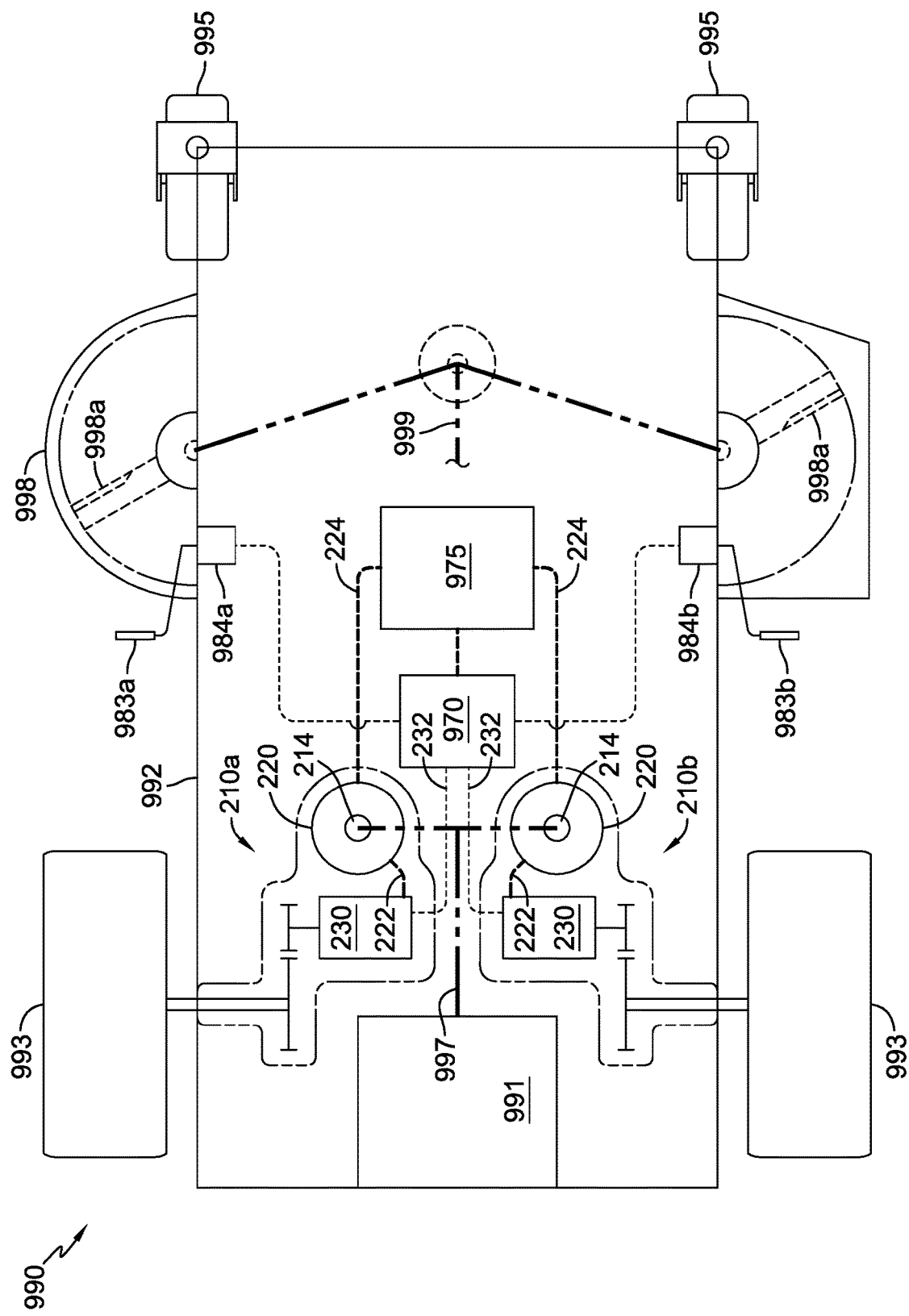
FIG. 9 is a top plan view of riding zero-turn vehicle similar to that shown in FIG. 6 and including two of the transaxles shown in FIG. 2, with the prime mover driving the deck assembly.

FIG. 9 illustrates a zero-turn vehicle 990 that is similar in many respects to the vehicle 690 described above. Vehicle 990 includes two transaxles 210a and 210b and prime mover 991 supported by frame 992, with prime mover 991 configured to drive the input shafts 214 of transaxles 210a and 210b, which in turn power the power generating devices 220 of the transaxles 210a and 210b (as described above in conjunction with FIG. 2). Vehicle 990 includes a belt and pulley assembly 997 that operably connects prime mover 991 to input shafts 214 of transaxles 210a and 210b.

Vehicle 990 also includes two control levers 983a and 983b (or other suitable operator control devices) and two position sensors 984a and 984b operatively connected thereto to detect the positions of control levers 983a and 983b, and controller 970 operatively connected to position sensors 984a and 984b. Control lever 983a, position sensor 984a, and controller 970 enable the vehicle user to control the electric motor 230 of transaxle 210a, and control lever 983b, position sensor 984b, and controller 970 enable the vehicle user to separately control electric motor 230 of transaxle 210b in a manner similar to that described above. Controller 970 is powered by battery 975 and powered by the power generating devices 220 of transaxles 210a and 210b.

Vehicle 990 also includes rear wheels 993 and front casters 995 similar to the embodiment in FIG. 6. Vehicle 990 further includes a mowing deck 998 supported by frame 992. Similar to the embodiment shown in FIG. 8, prime mover 991 also powers one or more blades 998a of a mowing deck 998 by means of a belt and pulley assembly 999 that operably connects prime mover 991 to mowing deck 998 to drive blade(s) 998a.

Figure 7:
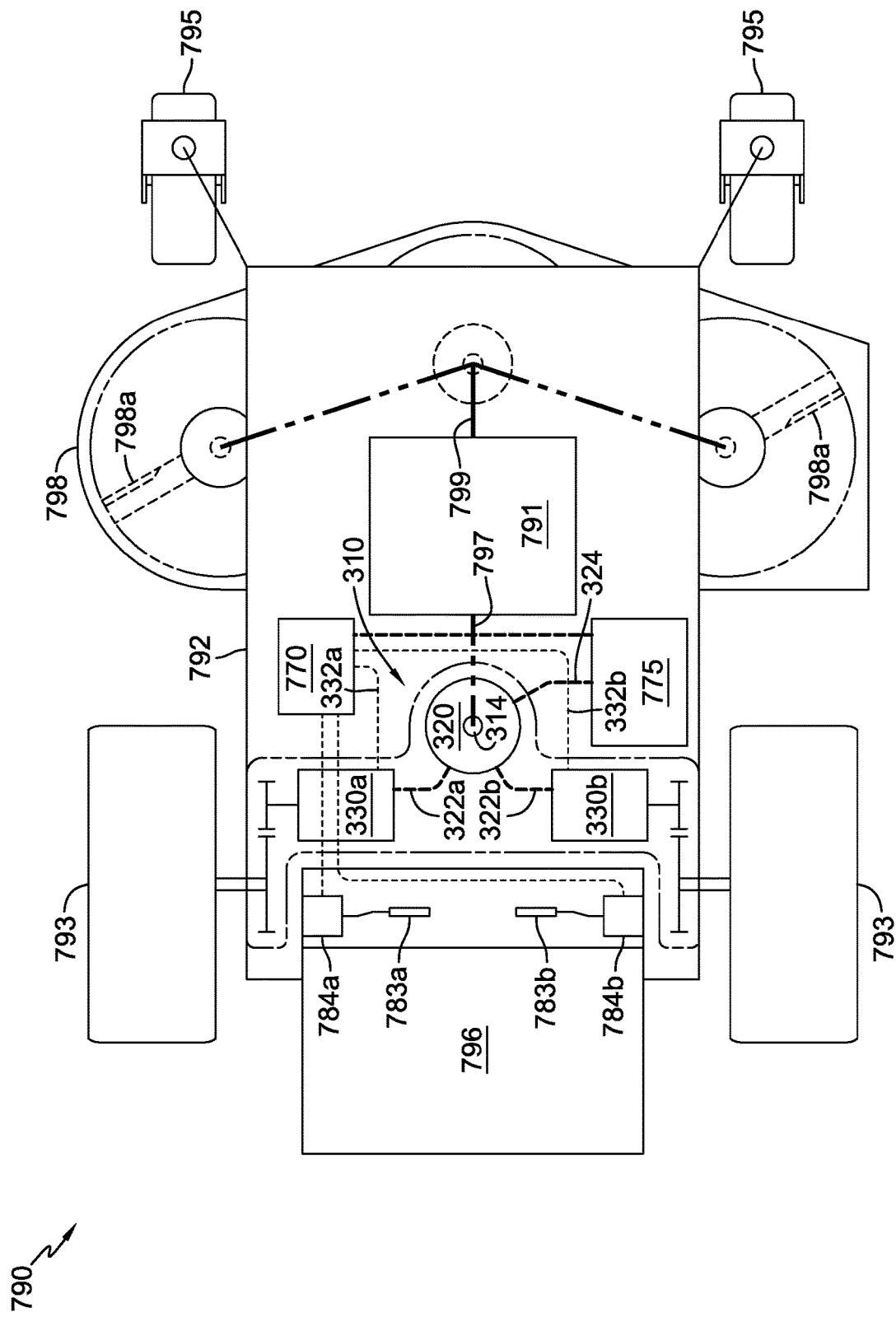
FIG. 7 is a top plan view of a stand-on zero turn vehicle including the transaxle of FIG. 3.

FIG. 7 illustrates a zero-turn vehicle 790 including the transaxle 310 and a frame 792 that supports the transaxle 310. The vehicle 790 includes a prime mover 791 configured to drive the input shaft 314 of the transaxle 310, which in turn powers the power generating device 320 of the transaxle 310 (as described above in conjunction with FIG. 3). In this embodiment, the vehicle 790 includes a belt and pulley assembly 797 that operably connects the prime mover 791 to the input shaft 314 of the transaxle 310 such that the prime mover 791 may drive the input shaft 314, though any other suitable power transfer device or system may be employed. The prime mover 791 also powers one or more blades 798a of a mowing deck 798 supported by the frame 792 of the vehicle 790. In this embodiment, the vehicle 790 includes a belt and pulley assembly 799 that operably connects the prime mover 791 to the mowing deck 798 such that the prime mover 791 may drive the blade(s) 798a, though any other suitable power transfer device or system may be employed.

The vehicle 790 also includes two control levers 783a and 783b (or other suitable operator control devices) on opposite sides of vehicle 790, two position sensors 784a and 784b operatively connected to the respective control levers 783a and 783b such that the position sensors 784a and 784b may detect the positions of the corresponding control levers 783a and 783b, and a controller 770 operatively connected to the position sensors 784a and 784b. The control lever 783a, the position sensor 784a, and the controller 770 enable the vehicle user to control the electric motor 330a of the transaxle 310, and the control lever 783b, the position sensor 784b, and the controller 770 enable the vehicle user to separately control the electric motor 330b of the transaxle 310. More specifically, in this embodiment, when the vehicle user moves the control lever 783a (or 783b) to a particular position, the position sensor 784a (or 784b) communicates this position to the controller 770, which in turn sends an appropriate control input to the electric motor 330a (or 330b) of the transaxle 310 to modify the output of the electric motor 330a (or 330b) and, therefore, the output of the transaxle 310, accordingly. The controller 770 is powered by a battery 775 and powered by the power generating device 320 of the transaxle 310, though in other embodiments the controller 770 is powered by a combination of the battery 775 and the power generating device 320 or solely by the power generating device 320.

Vehicle 790 also includes rear wheels 793 and front casters 795. The rear wheels 793 are engaged to and driven by transaxle 310 (as described above in conjunction with FIG. 3). Vehicle 790 also includes an operator platform 796 on which the vehicle user may stand when operating the vehicle 790.

Figure 8:
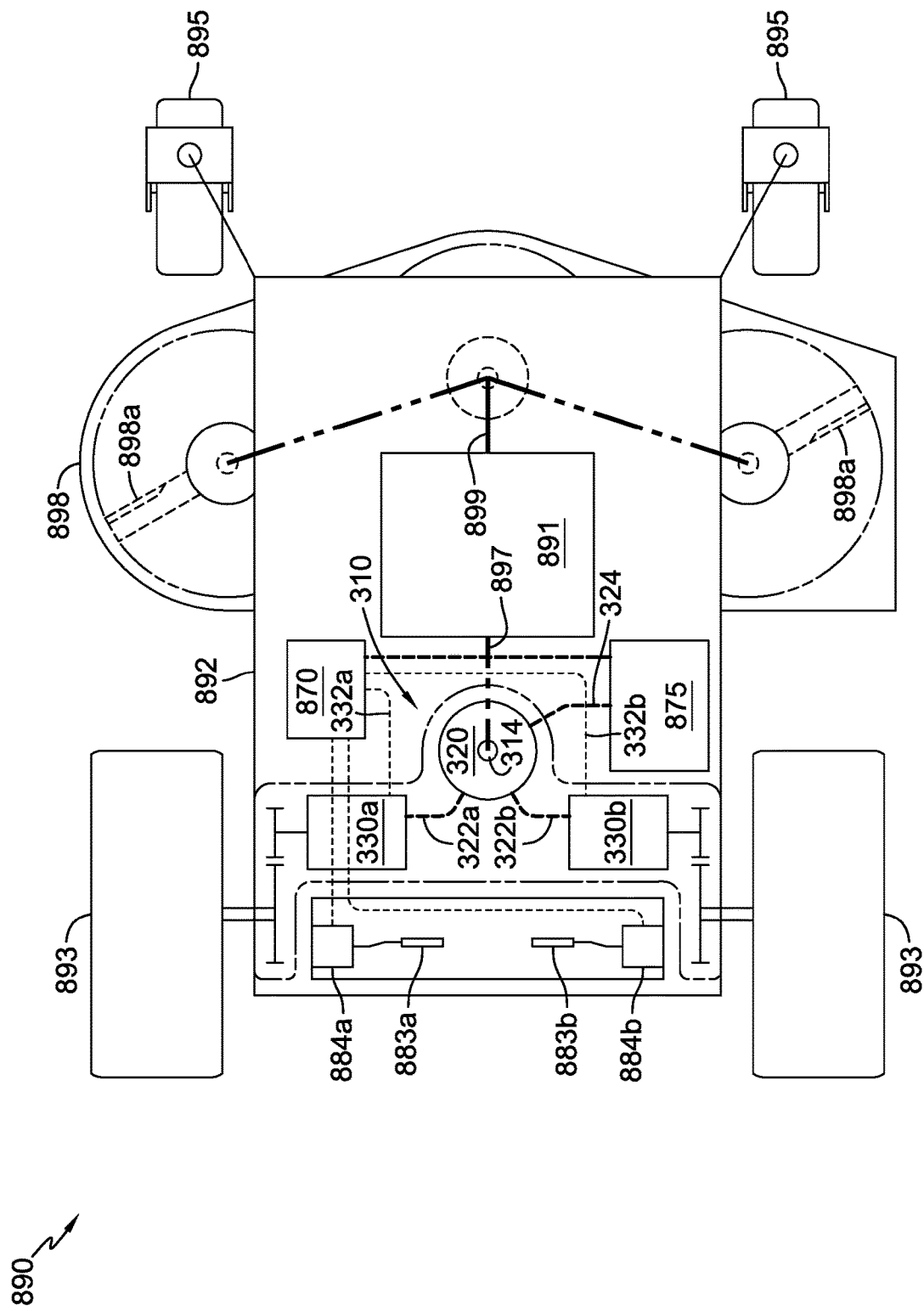
FIG. 8 is a top plan view of a walk-behind zero-turn vehicle including the transaxle of FIG. 3.

FIG. 8 illustrates a walk-behind zero-turn vehicle 890 including transaxle 310 and a frame 892 that supports transaxle 310. Vehicle 890 includes a prime mover 891 supported by frame 892 and configured to drive input shaft 314 of transaxle 310, which in turn powers power generating device 320 of the transaxle 310 (as described above in conjunction with FIG. 3). In this embodiment, vehicle 890 includes a belt and pulley assembly 897 that operably connects prime mover 891 to input shaft 314 of transaxle 310 such that prime mover 891 may drive input shaft 314, though any other suitable power transfer device or system may be employed. The prime mover 891 also powers one or more blades 898a of a mowing deck 898 supported by frame 892 of vehicle 890. In this embodiment, vehicle 890 includes a belt and pulley assembly 899 that operably connects prime mover 891 to mowing deck 898 such that prime mover 891 may drive blade(s) 898a, though any other suitable power transfer device or system may be employed.

The vehicle 890 also includes two control levers 883a and 883b (or other suitable operator control devices), two position sensors 884a and 884b operatively connected to the respective control levers 883a and 883b such that the position sensors 884a and 884b may detect the positions of the corresponding control levers 883a and 883b, and a controller 870 operatively connected to the position sensors 884a and 884b. The control lever 883a, the position sensor 884a, and the controller 870 enable the vehicle user to control the electric motor 330a of the transaxle 310, and the control lever 883b, the position sensor 884b, and the controller 870 enable the vehicle user to separately control the electric motor 330b of the transaxle 310. More specifically, in this embodiment, when the vehicle user moves the control lever 883a (or 883b) to a particular position, the position sensor 884a (or 884b) communicates this position to the controller 870, which in turn sends an appropriate control input to the electric motor 330a (or 330b) of transaxle 310 to modify the output of the electric motor 330a (or 330b) and, therefore, the output of the transaxle 310, accordingly. The controller 870 is powered by a battery 875 and powered by the power generating device 320 of the transaxle 310, though in other embodiments the controller 870 is powered by a combination of the battery 875 and the power generating device 320 or solely by the power generating device 320.

The vehicle 890 also includes rear wheels 893 and front casters 895. The rear wheels 893 are engaged to and driven by the transaxle 310 (as described above in conjunction with FIG. 3).

FIG. 14 illustrates a zero-turn vehicle 1090 that is similar in many respects to the vehicles described above, and in particular vehicle 990 of FIG. 9. Vehicle 1090 includes transaxle 1310' shown in FIG. 10A. Prime mover 1091 is supported by frame 1092, with prime mover 1091 configured to drive the input shaft 314 of transaxle 1310' to power the power generating device 320 of the transaxle 1310'. Vehicle 1090 includes a belt and pulley assembly 1097 that operably connects prime mover 1091 to input shaft 314, and power generating device 320 includes a PTO clutch-brake assembly 350. It will be understood that prime mover 1091 could be mounted above transaxle 1310' in a direct drive arrangement.

Vehicle 1090 also includes two operator controls 384a', 384b' (shown here as levers and position sensor modules) operatively connected to CAN-Bus 360 by means of conductors 385a and 385b to allow the vehicle user to independently control the electric motors 330a, 330b of transaxle 1310'. CAN-Bus 360 is also connected to VIM 355 by means of conductor 323 as previously described, and is connected to motor controllers 349a and 349b by means of conductors 333a' and 333b'. Battery 375 is also connected to VIM 355 by means of conductor 325 and to power generating device 320 by means of conductor 324.

Vehicle 1090 includes driven rear wheels 1093 and front casters 1095 similar to the embodiments of FIGS. 6 and 9. Vehicle 1090 further includes a mowing deck 1098 supported by frame 1092. Prime mover 1091 powers one or more blades 1098a of the mowing deck 1098 via engagement of the PTO clutch-brake 350 and by means of a belt and pulley assembly 1099.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A vehicle drive and control system for use on a vehicle having a prime mover, and at least one driven wheel, the vehicle drive and control system comprising:
   an operator control device;
   a common housing having a first side and a second side opposite the first side;
   a first axle extending out the first side of the common housing and a second axle extending out the second side of the common housing;
   an input shaft extending into the common housing, wherein the input shaft is engaged to and driven by the prime mover;
   a power generating device disposed within the common housing and driven by the input shaft;
   a first electric motor disposed within the common housing and directly connected to and powered by the power generating device, wherein the first axle is driven by the first electric motor; and
   a second electric motor disposed within the common housing and directly connected to and powered by the power generating device, wherein the second axle is driven by the second electric motor;
   a battery operatively connected to and powered by the power generating device and disposed external to the common housing;
   a first controller operatively connected to the power generating device and disposed within the common housing, wherein the first controller is configured to back-drive the power generating device when certain predetermined conditions are met; and
   at least one motor controller disposed within the common housing and operatively connected to the operator control device, the first electric motor and the second electric motor, such that the at least one motor controller may control an output of the first electric motor and an output of the second electric motor based on input received via the operator control device, and wherein the at least one motor controller is configured to operate the first and second electric motors as first and second generators under certain operating conditions.

2. The vehicle drive and control system of claim 1, wherein the at least one motor controller comprises a first motor controller disposed within the common housing and connected to the first electric motor and a second motor controller disposed within the common housing and connected to the second electric motor.

3. The vehicle drive and control system of claim 2, wherein the operator control device comprises a first motor control lever operatively engaged to the first motor controller and a second motor control lever operatively engaged to the second motor controller.

4. The vehicle drive and control system of claim 1, wherein the input shaft is perpendicular to both the first axle and the second axle.

5. The vehicle drive and control system of claim 1, further comprising a CAN bus connected to the at least one motor controller, the first controller and the operator control device.

6. The vehicle drive and control system of claim 5, wherein the at least one motor controller comprises a first motor controller disposed within the common housing and connected to the first electric motor and the CAN bus; and a second motor controller disposed within the common housing and connected to the second electric motor and the CAN bus.

7. The vehicle drive and control system of claim 5, wherein the operator control device comprises a first motor control lever operatively engaged to CAN bus and a second motor control lever operatively engaged to the CAN bus.

8. The vehicle drive and control system of claim 1, further comprising at least one sensor, the at least one sensor operatively connected to the at least one motor controller, the at least one motor controller further configured to operate with the at least one sensor to stop or reverse the first electric motor and the second electric motor in response to detecting a certain different predetermined condition.

9. The vehicle drive and control system of claim 8, wherein the at least one sensor is a vehicle slope sensor, and wherein the certain different predetermined condition is when the vehicle slope sensor detects a predetermined slope of the vehicle.

10. A utility vehicle, comprising:
    a prime mover disposed on the utility vehicle;
    an operator control device;

a first axle extending out a first side of a transaxle housing and a second axle extending out a second side of the transaxle housing;

an input shaft extending into the transaxle housing, wherein the input shaft is engaged to and driven by the prime mover;

a power generating device disposed within the transaxle housing and driven by the input shaft;

a first electric motor disposed within the transaxle housing and directly connected to and powered by the power generating device, wherein the first axle is driven by the first electric motor; and a second electric motor disposed within the transaxle housing and directly connected to and powered by the power generating device, wherein the second axle is driven by the second electric motor;

a battery operatively connected to and powered by the power generating device and disposed external to the transaxle housing;

a first controller operatively connected to the power generating device and disposed within the transaxle housing; and at least one motor controller disposed within the transaxle housing and operatively connected to the operator control device, the first electric motor and the second electric motor, such that the at least one motor controller may control an output of the first electric motor and an output of the second electric motor based on input received via the operator control device.

11. The utility vehicle of claim 10, wherein the at least one motor controller is configured to operate the first and second electric motors as first and second generators under certain operating conditions.

12. The utility vehicle of claim 11, wherein the at least one motor controller comprises a first motor controller disposed within the transaxle housing and connected to the first electric motor and a second motor controller disposed within the transaxle housing and connected to the second electric motor.

13. The utility vehicle of claim 10, wherein the first controller is configured to back-drive the power generating device when certain predetermined conditions are met.

14. The utility vehicle of claim 10, further comprising a CAN bus disposed on the utility vehicle and connected to the first controller and the at least one motor controller.

15. The utility vehicle of claim 14, wherein the at least one motor controller comprises a first motor controller disposed within the transaxle housing and connected to the first electric motor and the CAN bus; and a second motor controller disposed within the transaxle housing and connected to the second electric motor and the CAN bus.

16. The utility vehicle of claim 15, wherein the operator control device comprises a first motor control lever operatively engaged to the CAN bus and a second motor control lever operatively engaged to the CAN bus.

17. The utility vehicle of claim 15, wherein the first motor controller and the second motor controller are configured to operate the first and second electric motors, respectively, as first and second generators under certain operating conditions.

18. The utility vehicle of claim 9, wherein the power generating device is a generator.

19. The utility vehicle of claim 9, further comprising a motor deck disposed on a vehicle frame and operatively connected to a clutch/brake assembly.

20. The utility vehicle of claim 19, wherein the power generating device is a generator, and the clutch/brake assembly is operatively engaged to the generator.

* * * * *